United States Patent [19]
Klappert

[11] 3,812,554
[45] May 28, 1974

[54] CRIMP LOCKED OUTER TURN FOR INDUCTION CORE

[75] Inventor: Willi Klappert, Hickory, N.C.

[73] Assignee: General Electric Company, Pittsfield, Mass.

[22] Filed: Apr. 3, 1972

[21] Appl. No.: 240,466

[52] U.S. Cl. .............................. 24/20 EE, 336/211
[51] Int. Cl. ...................... H01f 27/26, B65d 63/02
[58] Field of Search.................... 336/211; 24/20 EE

[56] References Cited
UNITED STATES PATENTS

| 430,000 | 6/1890 | Clark | 24/20 EE UX |
|---|---|---|---|
| 2,282,854 | 5/1942 | Driftmeyer | 336/211 UX |
| 2,972,724 | 2/1961 | Flumerfelt | 336/211 UX |
| 3,177,538 | 4/1965 | Timmerbeil | 24/20 EE |
| 3,186,067 | 6/1965 | Somerville | 36/211 UX |
| 3,401,431 | 9/1968 | Heckmanns | 24/20 EE |
| 3,457,599 | 7/1969 | Timmerbeil et al. | 24/20 EE |

*Primary Examiner*—Donald A. Griffin
*Attorney, Agent, or Firm*—Francis X. Doyle; Volker R. Ulbrich; John J. Kelleher

[57] ABSTRACT

The outer turn of a precut laminated induction core is provided with a crimp lock to enable such turn to be locked to form a stacking ring or sleeve such that the other cut turns may be reassembled and formed within such crimp locked outer turn without welding or banding of such outer turn.

4 Claims, 8 Drawing Figures

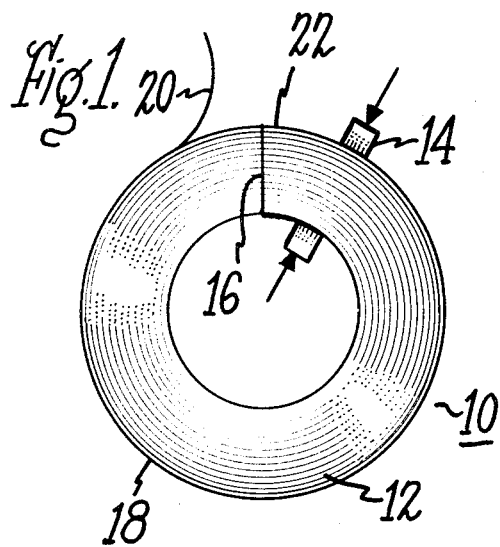
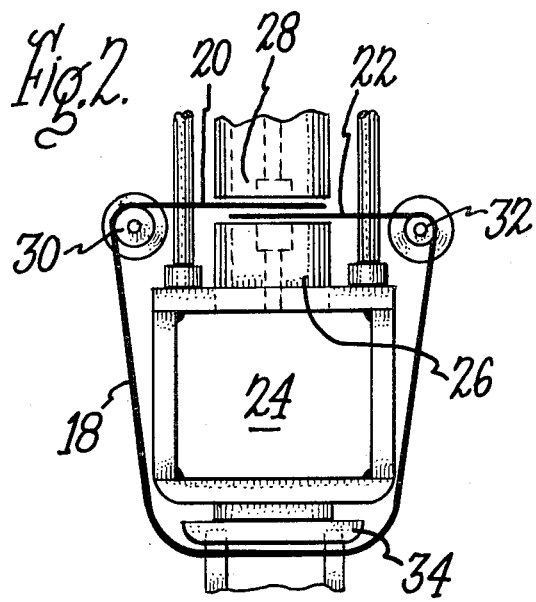
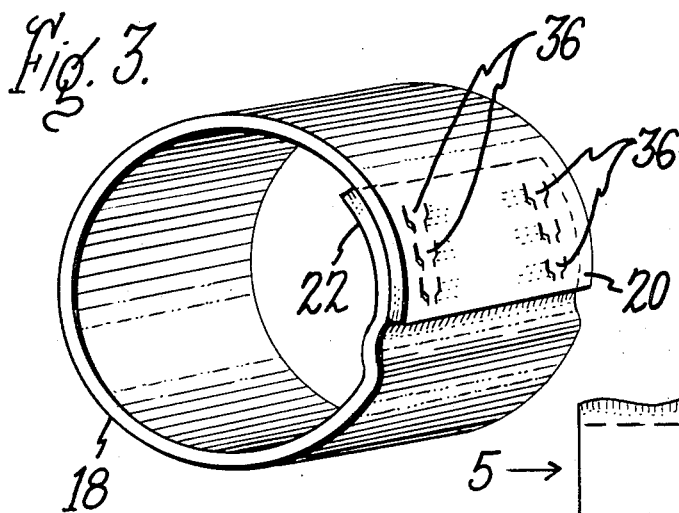
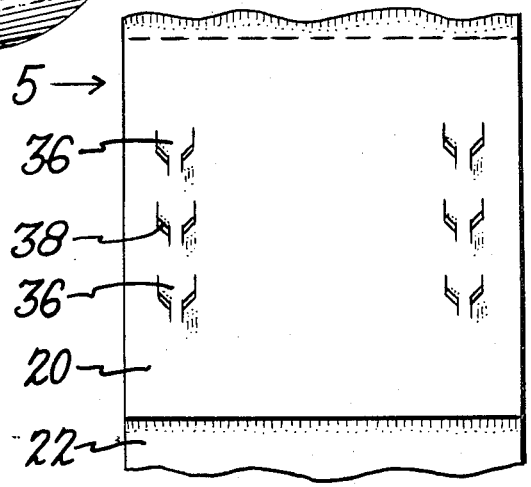

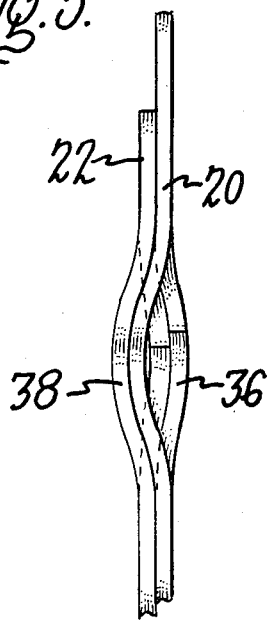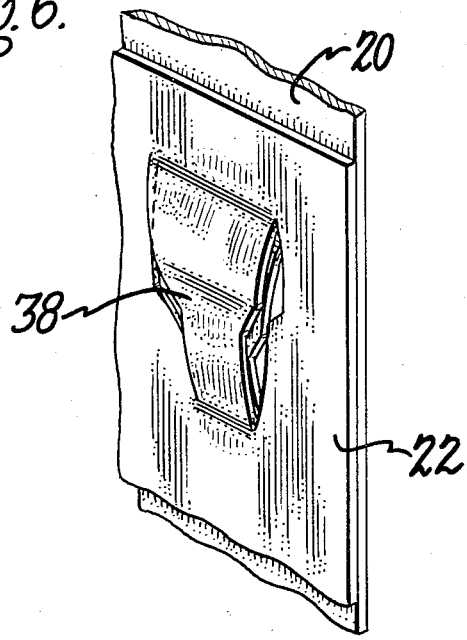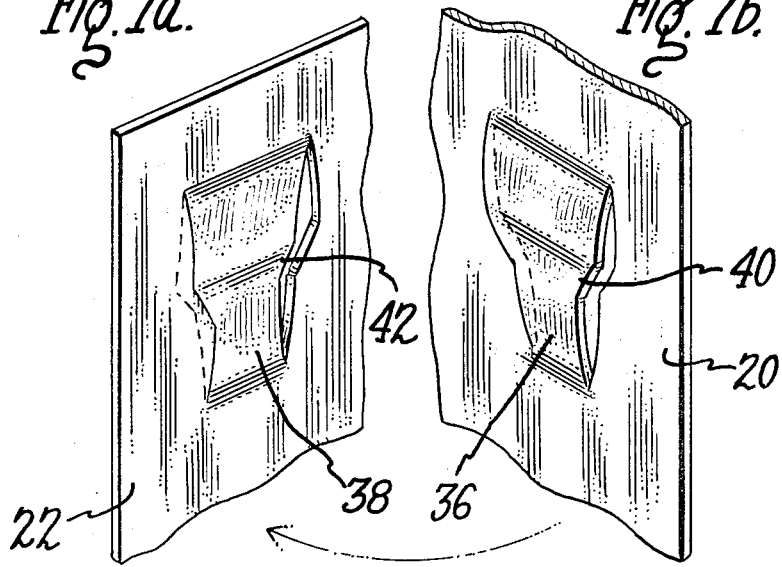

CRIMP LOCKED OUTER TURN FOR INDUCTION CORE

BACKGROUND

This invention relates to magnetic induction cores and more particularly to the provision of a crimp lock for the outer turn of such cores to enable stacking within such crimp locked outer turn.

In the magnetic core art for use in magnetic induction apparatus, the core is formed of a plurality of layers of magnetic strip material. Often the core material is wound about a mandrel in a circular form until the desired number of laminations are provided. Then the wound core is cut, for example, along a single radial line, to provide single turn laminations. The cut laminations are then reassembled, shaped and annealed to form the desired core. See, for example, U.S. Pat. No. 3,186,067. In this manufacturing process, usually the outer turn is banded or welded to the desired circumference and the other laminations are assembled within such outer turn which may be called a stacking ring or sleeve.

As will be understood, welding or banding are both relatively expensive operations and also require additional work in removing the band or in releasing the welding at a later period in the process of making the magnetic core. Further, welding can often upset the electrical or physical properties of the outer turn of the magnetic material. Also, on occasions the band used to hold the assembled core together can introduce undesired foreign substances into the magnetic material during the annealing operation. It has generally been considered desirable to provide a means for using the outer lamination as a stacking ring or sleeve without either banding or welding thereof. It is believed that this would be a less expensive process and also would enhance the magnetic and electrical properties of the core.

SUMMARY OF THE INVENTION

It is, therefore, a principal object of this invention to provide a self-locking stacking ring or sleeve for a cut induction magnetic core.

A further object of this invention is to provide an outer turn of a cut induction core with a crimp cut therein to enable the ends of such turn to be interlocked to make thereof a stacking ring or sleeve.

In carrying out this invention in a preferred form, the outer turn of a cut wound core is placed in a punch device with its ends in overlapping relation. A punch is forced into the overlapped ends of the outer turns placing a crimp cut in each end. Tension is then applied to the turn causing the ends to move in a direction away from each other causing an interlocking of the crimp cuts.

The invention which is sought to be protected will be particularly pointed out and distinctly claimed in the claims appended hereto. However, it is believed that this invention and the manner in which its various objects and advantages are obtained, as well as other objects and advantages thereof, may be better understood by reference to the following detailed description of a preferred embodiment thereof particularly when considered in the light of the accompanying drawings.

BRIEF DESCRIPTION OF DRAWINGS

FIG. 1 is a front view of one form of wound core cut through on a radial line that may utilize the interlocking means of this invention;

FIG. 2 is a front view of a portion of one type of punch press which may be used in carrying out this invention FIG. 3 is a perspective view of the outer turn of a cut core showing one form of the interlocking means of this invention;

FIG. 4 is a partial view of the outer turn of FIG. 3 showing a preferred form of the locking means of this invention in the overlapped edges thereof;

FIG. 5 is an edge view of a portion of the interlocking means shown in FIG. 4;

FIG. 6 is a partial perspective view of the crimp locking means shown in FIG. 5; and FIGS. 7a and 7b are perspective views of the portions shown in FIG. 6 separated from each other to more clearly show the details of the preferred crimp lock of this invention.

DETAILED DESCRIPTION OF THE PREFERRED EMBODIMENT

This invention relates to induction cores and in particular it relates to a means of locking the outer turn of such core. Referring to the drawings in which like numerals are used to indicate like parts throughout, FIG. 1 shows a wound core 10 wound from a strip of magnetic steel 12 into a plurality of laminations. The core is shown as being clamped by clamping means 14 and cut along a radial line 16 to form a plurality of single turn laminations. The outer turn 18 has its edge 20 turned back, as shown, during cutting so that the outer turn 18 will have overlapped ends 20 and 22.

FIG. 2 shows the outer turn 18 with the edges or ends 20, 22 overlapped in the punch press device 24. As will be understood, any type of punch press device or punch device may be used, as long as a crimp cut is made in the overlapped ends 20,22. Partially shown in FIG. 2 is a hydraulic punch press 24 having a fixed die member 26 and a movable die member 28 engaging the ends 20, 22 of the outer turn 18. The outer turn 18 is shown as being placed about roller members 30,32 and extending below a movable ram 34, all forming part of the punch press 24. After die 28 has been forced into overlapped ends 20,22, making crimp cuts therein, the ram 34 is moved in a downward direction thus causing the ends 20,22 to move in opposite direction, that is, in a direction away from each other thereby causing the crimp cuts to inter-engage thus locking ends 20,22 securely together.

FIG. 3 shows a perspective view of the outer turn 18 with ends 20,22 locked together. As there shown, a plurality of crimp cuts 36 are formed in end 20. Of course, a similar plurality of cuts 38 are also formed in the end 22 matching the cuts 36 made in end 20. The matching of the cuts is best shown in FIGS. 6 and 7 of the drawing. Of course, it will be understood that as many or as few crimp cuts 36,38 may be provided as desired. It is only necessary that there be matching crimp cuts 36,38 in each of ends 20,22. For small cores, a single pair of crimp cuts interlocking may be sufficient to hold the outer turn securely together. For heavier cores, a plurality of cuts, for example, the six matching cuts shown in FIGS. 3 and 4, may be desired. FIG. 4 shows an enlarged view of the overlapped ends 20,22 with crimp cuts 36 and an interlocking portion of the crimp cuts 38.

The preferred interlocking crimp cut of this invention is best shown in FIGS. 5, 6, and 7. As is shown in FIGS. 5 and 6, after the crimp cuts 36 and 38 are made in ends 20,22, respectively, and the ends are moved away from each other, the edges of the crimp cuts 36,38 interlock with each other. As can be seen, the interlocking of the edges of crimp cuts 36 and 38 prevent further movement of ends 20,22 away from each other thereby locking the outer turn 18 in the circular form shown in FIG. 3. As will be understood, after outer turn 18 is locked in the stacking ring or sleeve form shown in FIG. 3, the other cut turns of the core may be stacked into the locked turn 38, for example, in the manner described in U.S. Pat. No. 3,186,067. Obviously, the stacked core may then be shaped and annealed, as desired.

FIGS. 7a and 7b show the preferred form of crimp cut according to this invention. As is shown in FIGS. 7a and 7b, both of crimp cuts 36 and 38 are identical. The cuts are formed with a large attached top portion, a protruding angled central portion 40 and 42, respectively, and a smaller attached end portion. As is apparent, particularly from FIGS. 5 and 6, after the identical cuts are made, and the ends 20,22 are moved away from each other, the protruding central portion 40 of cut 36 slides along the central portion 42 of cut 38 and the central portion 40 of cut 36 will slide under the edges of the cut 38 of end 22 thereby causing ends 20 and 22 to be locked securely together.

While there has been shown and described the present preferred embodiment of this invention, it will, of course, be understood by those skilled in the art that various changes may be made in the various constructional details. For example, the preferred crimp cut may be changed as desired as long as the cuts are made so that on movement of the ends of the core member the cuts will interlock to form the desired stacking ring. The invention has been described with identical cuts since this is the fastest and least costly method of making the cuts since they can be done at the same time and after being made, the ends may be moved apart to provide the desired locking. It will be understood, however, that the cuts would be made of different configurations. For example, the ends could be butting and the die punch could make different configured cuts in each end. The only requirement is that the cuts interlock when brought together. The invention which is sought to be protected is described in the appended claims.

What is desired to be secured by Letters Patent of the United States is:

1. An interlocked outer turn of a cut induction core for use as a stacking ring for a cut core of an induction apparatus and formed from a strip of magnetic steel comprising: an outer turn having overlapped ends, said overlapped ends having at least one crimp cut in each of said ends, portions of said one crimp cut in one said end being interlocked with portions of the said one crimp cut in the other said end.

2. An interlocked outer turn of a cut induction core for use as a stacking ring for a cut core of an induction apparatus and formed from a strip of magnetic steel comprising; an outer turn having overlapped ends, each of said overlapped ends having at least one identical crimp cut therein, a protrusion of one crimp cut being interlocking with the edges of the other said identical crimp cut.

3. An interlocked outer turn as set forth in claim 2 in which each said crimp cut has an attached larger end, an attached smaller end and an angled protruding center portion, the center portion of one said crimp interlocking with the edges of the other said crimp cut.

4. An interlocked outer turn of a cut induction core for use as a stacking ring for an induction core and formed from a strip of magnetic steel comprising; overlapped ends of said outer turn, at least one pair of crimp cuts provided in said overlapped ends and a protruding portion of one of said pair of crimp cuts engaging the edges of said other crimp cut thereby interlocking the ends of said outer turn.

* * * * *